US006405623B2

(12) United States Patent
Lavallee

(10) Patent No.: US 6,405,623 B2
(45) Date of Patent: Jun. 18, 2002

(54) PAPER REMOVAL DEVICE

(75) Inventor: Andre A. Lavallee, Thompson, CT (US)

(73) Assignee: L&P Converters, Inc., Southbridge, MA (US)

(*) Notice: Subject to any disclaimer, the term of this patent is extended or adjusted under 35 U.S.C. 154(b) by 0 days.

(21) Appl. No.: 09/922,094

(22) Filed: Aug. 3, 2001

Related U.S. Application Data

(62) Division of application No. 09/283,597, filed on Apr. 1, 1999.

(51) Int. Cl.[7] .............................. B26D 3/16; B23B 1/00

(52) U.S. Cl. .............................. 83/13; 83/862; 83/100; 83/63; 83/471.1; 83/471.2; 83/76.8; 83/56; 83/490; 83/924; 82/1.11; 82/101

(58) Field of Search .............................. 83/861, 862, 13, 83/63, 72, 98, 76.8, 167, 471.2, 477.1, 490, 56, 564, 597, 676, 100, 924, 733, 39–50; 82/59, 86, 101, 122, 1.11

(56) References Cited

U.S. PATENT DOCUMENTS

| | | | | | |
|---|---|---|---|---|---|
| 582,689 | A | | 5/1897 | Riehl | |
| 1,215,388 | A | | 2/1917 | Lanford | |
| 1,518,750 | A | | 12/1924 | Nelson | |
| 1,701,045 | A | | 2/1929 | Kraus | |
| 1,779,778 | A | | 10/1930 | Nelson | |
| 1,831,085 | A | | 11/1931 | Williams | |
| 2,154,326 | A | | 4/1939 | Dorin | |
| 2,297,177 | A | | 9/1942 | Tiffany | 146/160 |
| 2,503,051 | A | | 4/1950 | Jeckert | |
| 3,019,506 | A | | 2/1962 | Pearne | |
| 3,570,731 | A | | 3/1971 | Waltz | |
| 3,752,024 | A | * | 8/1973 | Judelson | 82/53 |
| 3,777,606 | A | | 12/1973 | Goldstein | 83/460 |
| 3,898,898 | A | * | 8/1975 | Peres | 30/406 |
| 4,046,038 | A | | 9/1977 | West | |
| 4,139,134 | A | | 2/1979 | Collins | 225/97 |
| 4,217,799 | A | | 8/1980 | Faris | |
| 4,370,140 | A | | 1/1983 | Fegley et al. | 493/289 |
| 4,401,003 | A | | 8/1983 | Baldwin | |
| 4,412,401 | A | * | 11/1983 | Fundell | 266/57 |
| 4,534,151 | A | * | 8/1985 | Schneck et al. | 493/342 |
| 4,579,025 | A | | 4/1986 | Fasolak | |
| 4,799,413 | A | | 1/1989 | Soderqvst | 83/71 |
| 4,864,906 | A | | 9/1989 | Hall | 83/886 |
| 4,878,410 | A | | 11/1989 | Darnell | 83/635 |
| 4,901,611 | A | * | 2/1990 | Bentley | 82/100 |
| 4,926,729 | A | | 5/1990 | Igarashi | 83/364 |
| 5,060,456 | A | * | 10/1991 | Wehrli | 53/381.2 |
| 5,261,301 | A | * | 11/1993 | Babb et al. | 82/70.1 |
| 5,315,907 | A | | 5/1994 | Biagiotti | 83/38 |
| 5,367,930 | A | | 11/1994 | Lemley | 83/368 |
| 5,383,380 | A | | 1/1995 | Sartori | |
| 5,410,929 | A | | 5/1995 | Wallace | 83/160 |
| 5,453,070 | A | | 9/1995 | Moody | 493/288 |
| 5,557,997 | A | | 9/1996 | Wunderlich et al. | 83/174 |
| 5,964,024 | A | * | 10/1999 | Wallace | 29/558 |

FOREIGN PATENT DOCUMENTS

| | | |
|---|---|---|
| FR | 1391062 | 1/1965 |
| GB | 502828 | 4/1938 |
| GB | 914725 | 1/1963 |

OTHER PUBLICATIONS

See attached IDS, sheet 3, originally filed in the still pending parent application 09/283,597 and resubmitted herein.

* cited by examiner

*Primary Examiner*—Boyer Ashley
(74) *Attorney, Agent, or Firm*—James H. Fritz

(57) ABSTRACT

A device for removing paper from a damaged paper roll. The device comprising a rotatable platform to support and rotate the paper roll about a central axis. Additionally, the device comprises a circular saw blade attached to a movable arm attached to a track adjacent to the paper roll. The arm is advanceable toward to the central axis of the paper roll such that as the roll is rotated, the saw blade will cut into the roll to thereby remove paper therefrom. The operation of the device can be automated by a controller and sensors such that a single operator can use the device.

5 Claims, 2 Drawing Sheets

PAPER REMOVAL DEVICE

CROSS-REFERENCE TO RELATED APPLICATIONS

This is a Divisional Application of Ser. No. 09/283,597, filed Apr. 1, 1999.

STATEMENT RE: FEDERALLY SPONSORED RESEARCH/DEVELOPMENT (Not Applicable)

BACKGROUND OF THE INVENTION

The present invention generally relates to paper roll salvaging and more particularly to a device which can remove the end of a damaged paper roll in order to make the roll reusable.

In the paper industry, large rolls of paper are manufactured by continuously winding the paper around a core. The rolls of paper are about three to five feet in diameter and about four feet in length. As such, the paper rolls are heavy and bulky. Typically, the rolls are stored vertically with an end of the roll on the ground. However, if the ground becomes wet, then the paper in the roll will absorb the moisture and become stained and unusable. Usually, only that portion the roll in contact with the ground will become unusable such that the remaining paper on the roll is useable. Typically, however, the whole roll of paper is considered unusable, such that the roll is recycled and none of the paper is used as intended. As will be recognized, the salvage value of the paper roll is substantially less than the value if usable in its intended manner. As such, there is a need for a device that can remove the damaged paper from the end of the roll such that the remaining non-damaged or degraded paper can be used.

The present invention addresses the above-mentioned deficiencies by providing a device that can remove the damaged end portion of a large paper roll. In this regard, the present invention cuts the length of the paper roll to the next usable length such that the damaged portion is removed. Therefore, the remaining paper on the roll can be reused, while the damaged portion may be recycled.

BRIEF SUMMARY OF THE INVENTION

In accordance with the preferred embodiment of the present invention, there is provided a device for removing paper form a paper roll having a central axis. The device comprises a frame with a platform rotatably attached thereto. The platform supports an end of the paper roll such that the platform can rotate the paper roll about its central axis. Extending from the frame generally parallel to the central axis of the paper roll is an elongate track. Attached to the track is a cutting arm that is movable toward and away from the central axis of the paper roll. A saw blade is attached to the cutting arm so as to reside in a plane that is generally perpendicular to the central axis such that as the cutting arm is moved toward the central axis during rotation of the paper roll, the saw blade will facilitate cutting of the paper roll.

In order to rotate the saw blade, a saw blade motor may be attached to the cutting arm and be operative to power the saw blade. Typically, the cutting arm is slidably mounted to the track and reciprocally movable therealong through the use of a drive mechanism. The drive mechanism may include a drive mechanism motor operative to move the cutting arm along the length of the track. In order to move the cutting arm toward the central axis of the paper roll, the cutting arm is pivotally mounted to the track. In this regard, the present invention may further comprise a cutting arm motor attached to the cutting arm and operative to move the cutting arm toward and away from the central axis by pivoting the cutting arm. Additionally, the platform may be rotated by a platform motor attached to the frame such that the paper roll rotates about the central axis.

In order to control the movement of the cutting arm, the platform and the saw blade, there is provided a controller attached to the frame. The controller is in electrical communication with the saw blade motor, the cutting arm motor, the drive mechanism motor and the platform motor. In this regard, the controller coordinates and directs the associated movements of the individual components in order to remove the paper from the roll. Furthermore sensors may be provided which aid in coordination of the motors by the controller.

Therefore, in order to remove paper, the paper roll is placed on the platform such that the central axis extends generally parallel to the track and the platform can rotate the paper roll about its central axis. Next, the rotating saw blade is advanced toward the central axis by the cutting arm such that the saw blade cuts the paper roll. The damaged end of the paper roll is removed thereby salvaging the remaining paper. To facilitate removal of paper, the end of the paper roll to be removed is cut with a circular handsaw before rotating on the platform. Typically, the present invention removes a relatively small section of the paper roll end such that if a large section of the end is to be removed, then the saw blade must cut multiple small sections from the paper roll. As such, the cutting arm must be repositioned along the track after each cut is made in order to remove a larger section.

BRIEF DESCRIPTION OF THE DRAWINGS

These as well as other features of the present invention, will become more apparent upon reference to the drawings wherein.

DETAILED DESCRIPTION OF THE INVENTION

Figure 1:
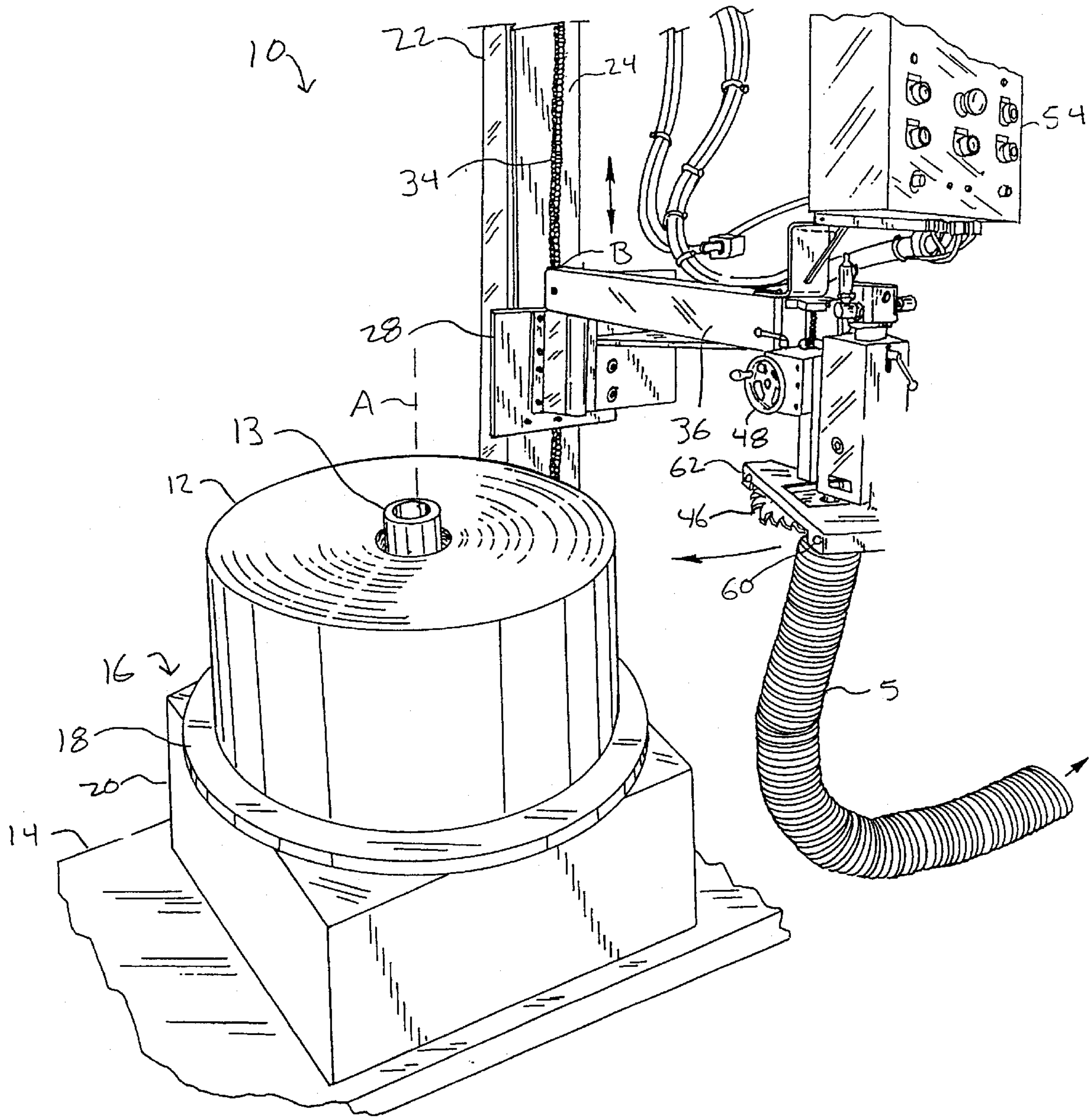
FIG. 1 is a perspective view of a paper removal device constructed in accordance with a preferred embodiment of the present invention.

Referring now to the drawings wherein the showings are for purposes of illustrating a preferred embodiment of the present invention only, and not for purposes of limiting the same, FIG. 1 perspectively illustrates a paper removing device 10 for salvaging a damaged cylindrical paper roll 12. The paper on paper roll 12 is wound about a hollow tubular core 13 which defines a central axis "A" of paper roll 12. The device 10 comprises a frame 14 which supports the components of the device 10 in a proper spacial relationship. As seen in FIG. 1, attached to the bottom of the frame 14 is a platform 16 for supporting the paper roll 12. The platform 16 includes a generally circular turntable 18 attached to a platform motor 20. The turntable 18 is sized to support the paper roll 12 such that the motor 20 can rotate the paper roll 12 about central axis "A" defining by and extending through the hollow tubular core 13 of paper roll 12.

Figure 2:
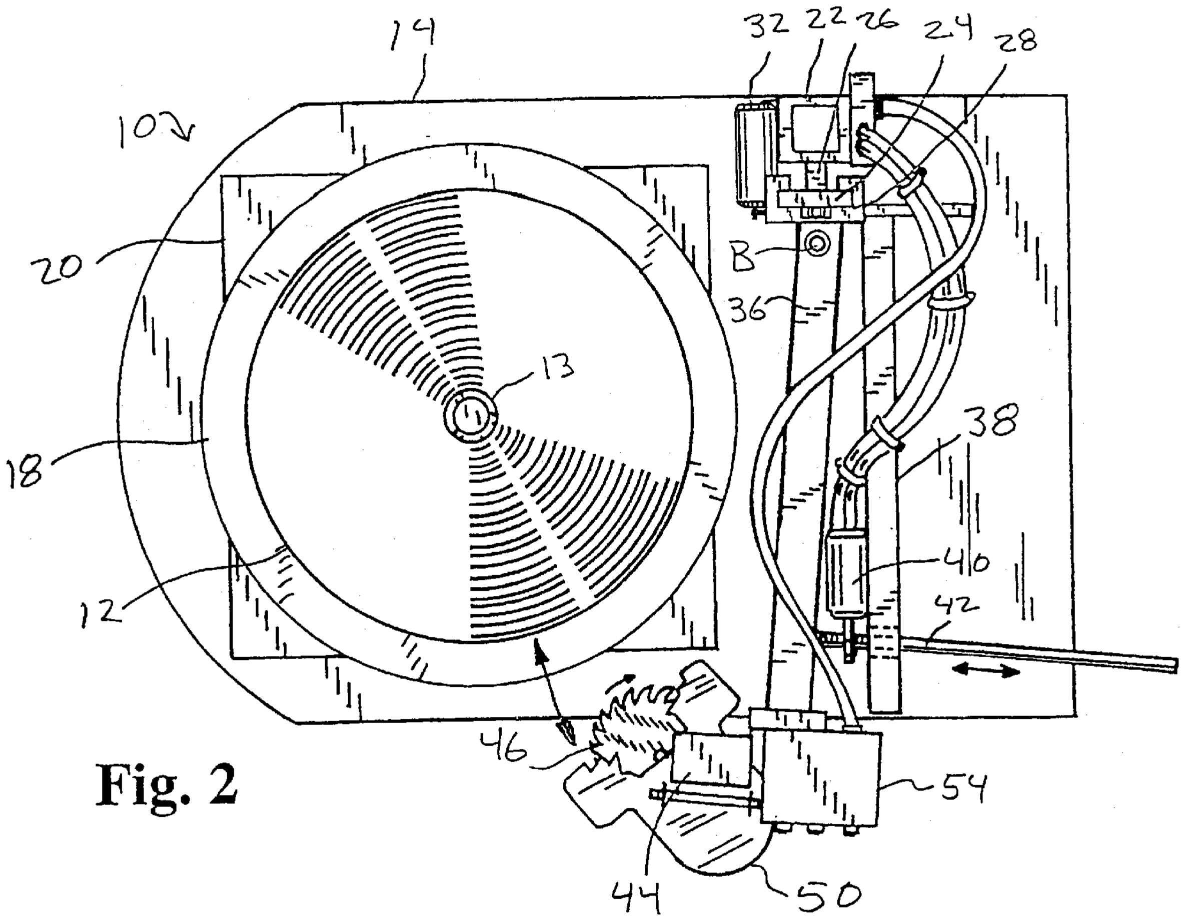
FIG. 2 is a top-plan view of the paper removal device shown in FIG. 1.

Attached to and extending upwardly from frame 14 is a support beam 22. The support beam 22 is attached to the frame 14 so as to extend in generally parallel spaced relation to central axis "A" when the paper roll 12 is positioned upon the turntable 18. As seen in FIG. 1 and 2, the support beam 22 is an elongate steel beam with a generally rectangular cross sectional configuration. The beam 22 is attached to the frame 14 such that it is adjacent to the platform 16. The beam 22 supports a linear track 24 along one side thereof. The track 24 is an elongate thin section of metallic material having a generally rectangular cross sectional configuration. The track 24 is attached the to beam 22 through the use of spacers 26 such that the track 24 extends in spaced, generally parallel relation to the beam 22. Therefore, the use of the spacers 26 results in a gap being defined between track 24 and beam 22. Additionally, the spacers 26 are connected to a back surface of track 24 such that track 24 overhangs the sides of each spacer to collectively define a generally "T" shaped cross sectional configuration with each spacer 26 at their mutual attachment point.

The track 24 is configured to support a slidable carriage 28 along the longitudinal length thereof. In this respect, the carriage 28 includes a channel 30 having a configuration which is complementary to that of the track 24 such that track 24 is receivable into channel 30. The complementary configuration of the track 24 and the channel 30 allows carriage 28 to be movable over the spacers 26 and thereby the length of track 24. In order to facilitate movement of carriage 28, the beam 22 includes a drive mechanism having a track motor 32 cooperatively engaged to move a chain 34. The chain 34 is attached to the top and bottom of carriage 28 such that as the track motor 32 moves chain 34, the carriage 28 will move in a corresponding direction. In this regard, the chain 34 is generally parallel to the track 24 in order to move carriage 28. As will be recognized by those of ordinary skill in the art, the carriage may be moved by alternative types of drive mechanisms such as a rack and pinion configuration or a cable and pulley system.

The carriage 28 is configured to support a pivoting cutting arm 36 and a stationary boom 38. Referring to FIG. 2, the stationary boom 38 is secured to a front side of carriage 28 opposite channel 30 such that boom 38 is generally perpendicular to track 24 and support beam 22.

The cutting arm 36 is rotatably coupled to the front side of carriage 28 at pivot point "B". In this respect, the cutting arm 36 is perpendicular to track 24 and beam 22 and co-planar to boom 38. Since pivot point "B" is located adjacent to the attachment point of boom 38 to carriage 28, the cutting arm 36 is able to swing toward and away from stationary boom 38 and therefore swing toward and away from the central axis "A" of paper roll 12 supported by platform 16. As will become apparent below, the length of cutting arm 36 is at least equal to or greater than the distance from axis "A" of paper roll 12 to support beam 22, as is necessary for desired paper removal by device 10.

In order to facilitate movement of the cutting arm 36 toward and away from the axis "A", a rotating cutting arm motor 40 is attached thereto as seen in FIG. 2. The cutting arm motor 40 is cooperatively engaged to a rack and pinion mechanism 42 that is attached to both the stationary boom 38 and cutting arm 36. Therefore, as the cutting arm motor 40 drives the rack and pinion mechanism 42, the cutting arm 36 is concurrently pivotally advanced toward or away from axis "A" of paper roll 12. As will be recognized by those of ordinary skill in the art, the rotational direction of cutting arm motor 40 will control the direction of cutting arm 36. Therefore, cutting arm motor 40 can control the advancement of cutting arm 36 toward or retraction of cutting arm 36 away from axis "A" of paper roll 12.

To facilitate removal of paper from the paper roll 12, the cutting arm 36 includes rotating saw motor 44 coupled to circular saw blade 46. As seen in FIGS. 1 and 2, the saw motor 44 is mounted to an end of cutting arm 36 opposite pivot point "B". The saw motor 44 typically is a hydraulic motor capable of rotating attached saw blade 46 at a prescribed rotational speed. The saw motor 44 is attached to cutting arm 36 such that saw blade 46 extends along a plane which is parallel to cutting arm 36 and turntable 18 and perpendicular to central axis "A" of paper roll 12. Additionally, the saw motor 44 is attached to cutting arm 36 in a position whereat the saw blade 46 can be advanced to axis "A" when cutting arm 36 is advanced toward paper roll 12. In other words, in order to facilitate paper removal, the saw blade 46 should advance toward the center of paper roll 12 when moved by cutting arm 36. Typically, the saw blade 46 is a circular saw blade capable to cut into the paper roll 12 without tearing.

Figure 3:
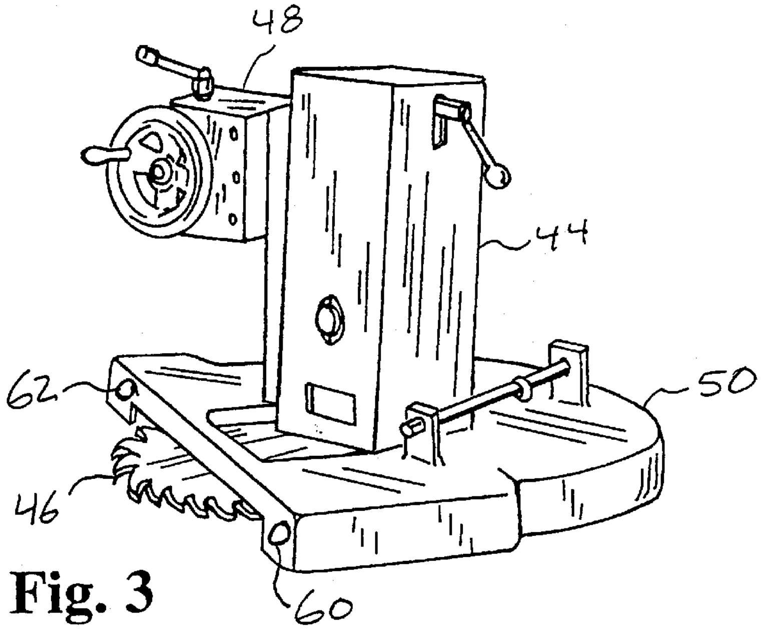
FIG. 3 is perspective view of the cutting head used with the paper removal device shown in FIG. 1.

The saw motor 44 is attached to the cutting arm 36 through an adjustment mechanism 48 capable of lowering and raising the saw blade 46 as seen in FIG. 3. The adjustment mechanism 48 can be a rack and pinion configuration such that the saw blade 46 can be lowered to a fine adjustment as may be necessary for precise cutting operations. Additionally, the saw motor 44 may need to be lowered onto the end of the paper roll 12 when the motor 44 is used to smooth the end of paper roll 12 as will be further explained below.

Attached proximate the saw blade 46 is a dust collector duct 50 which is itself attached to a hose 52 for removal of paper dust during cutting operations. The duct 50 is formed around the saw blade 46 in order to prevent inadvertent contact by the user with the rotating blade 46 and to draw paper dust into the hose 52. The hose 52 is attached to the top of the duct 52 (not shown) in order to facilitate proper removal of paper dust. Therefore, the hose 52 is connected to a vacuum source (not shown) such that any paper dust created by saw blade 46 is drawn into hose 52 and the vacuum source for proper disposal.

In the preferred embodiment of the present invention, a controller 54 is mounted to the cutting arm 36. The controller 54 is configured to coordinate the motion of the motors such that each motor cooperates in the removal of paper from paper roll 12. In this respect, the controller 54 is in electrical communication with platform motor 20, track motor 32, cutting arm motor 40 and saw blade motor 46 in order to control their operation during use of device 10 as will be further explained below. The controller 54 comprises a series of switches and controls which allow the paper removal operation to be either manually or automatically operated. The controller 54 can include a microprocessor or other type of circuitry to numerically control the operation of the various motors. In addition to using a controller 54 to control the operation of the various motors, it will be recognized that sensors which can detect the distance of the cutting arm 36 from boom 38 and central axis "A" of paper roll 12 may be used in conjunction with controller 54. As seen in FIG. 3, the duct 50 may include a distance sensor 60 and a wet paper sensor 62 that are in electrical communication with the controller 54. The distance sensor 60 can be an acoustic sensor or infrared sensor that detects the distance between the duct 50 and the paper roll 12. The wet paper sensor 62 may be a moisture sensor that detects the amount of moisture in the paper roll 12 for determining whether that section of paper roll 12 should be removed.

Having described the components of the paper removal device 10, the proper operation of such device 10 will be explained. When moisture damages the paper on an end of paper roll 12, the remainder of the paper on paper roll 12 can be used if the damaged end is removed. Therefore, the present invention is configured to remove the damaged end such that the remainder of the paper can still be used. In order to remove paper from paper roll 12, the paper roll 12 is placed upon turntable 18 such that the end to be cut is placed furthest the from the turntable 18 (i.e, the desired end to be cut will be the topmost end). Then, the end of paper roll 12 to be removed will be diametrically cut with a circular handsaw to a depth equal to the total width of the section to be removed from the paper roll 12 by the device 10.

The carriage 28 is positioned adjacent to the paper roll 12 such that the saw blade 46 is approximately two inches below the top surface of the end of paper roll 12 to be cut. The carriage 28 can be moved in a vertical direction with drive motor 32 moving the chain 34 under the direction of controller 54. Additionally, fine adjustments as to the cutting location can be made with adjustment mechanism 48. As will be recognized, the rotating saw blade 46 will cut the end of paper roll 12 off as it is advanced toward axis "A" while paper roll 12 is rotating on platform 16. However, since the saw blade 46 is slicing across the end of the paper roll 12, the weight of the paper above the blade 46 may cause the blade 46 to bind as it travels toward the center of paper roll 12. Therefore, it is preferable that the blade 46 slice only a width of about two inches from the end of the paper roll 12 as it is being advance toward central axis "A". Additionally by slicing only about two inches from the end of the paper roll 12, the removed paper is easier to handle since the strips removed are about two inches wide as opposed strips of larger widths. It will be recognized that if a section exceeding a two inch width is to be removed from the end of paper roll 12, then successive two inch slices or cuts may be made to equal the width of the section to be cut.

Once the saw blade is positioned adjacent to the paper roll 12 at the desired location, the turntable 16 is rotated by motor 20 such that paper roll 12 spins about central axis "A". The controller 54 is configured to control the speed and direction of motor 20 in order to rotate the paper roll 12. While the paper roll 12 is rotating, the saw motor 44 will rotate the circular saw blade 46 and cutting arm motor 40 will advance cutting arm 36 and blade 46 toward the central axis "A" of paper roll 12. The controller 54 can control the movement of the cutting arm 36 such that the rotating blade 46 can advance toward the central axis "A" of paper roll 12 as it is cutting. Distance sensor 60 can determine the distance between the cutting arm 36 and paper roll 12 in order to facilitate movement thereof. Since the end of the paper roll 12 was bisected with the circular handsaw, the blade 46 will cut the paper roll 12 into strips equal to one half of the circumference of the paper roll 12. The controller 54 can automatically advance the cutting arm 36 such that the operator can remove the cut paper strips while the paper roll 12 is rotating thereby permitting a single operator to use the device 10.

In addition to directing the advancement of the cutting arm 36, the controller 54 may also be configured to stop advancement of the arm 36 when the saw blade 46 reaches the core 13 of the paper roll 12 which defines the central axis "A". As such, once the blade 46 reaches the core 13, the controller 54 will reverse the movement of cutting arm motor 40 in order to retract the cutting arm 36 toward boom 38. Once the cutting arm 36 is retracted away from the paper roll 12, the track motor 32 under direction from controller 54 may reposition the carriage 28 downward to cut more paper from paper roll 12 if desired. Wet paper sensor 62 can determine if the section of paper roll 12 is to be removed by determining if the section of paper from paper roll 12 is wet. Once in the proper position, the cutting arm 36 will advance toward the center of paper roll 12 in order for blade 46 to cut more paper therefrom. This procedure will be repeated until the paper roll 12 is a desired length along axis "A". In the event that both ends of the paper roll 12 are damaged, it will be recognized that once one damaged end of the paper roll 12 is removed, then the other damaged end may be positioned in device 10 such that it will also be removed.

Once the damaged end(s) of the roll 12 has been removed, the cut end may then need to be smoothed from saw marks that may have been created by the advancement of blade 46. Therefore, the blade 46 may be replaced with a sanding disc which is used to smooth the cut surface. In this respect, the sanding disc is advanced over the cut surface of paper roll 12 with cutting arm 36 to smooth such surface. Adjustment mechanism 48 facilitates placement of the sanding disc on the cut surface since it is able to lower the disc down onto the surface thereof. It will be recognized that since the saw blade 46 is parallel to turntable 18, the saw blade 46 will cut the end of the paper roll 12 parallel to the end of the paper roll 12 supported upon turntable 18.

As will be recognized by those of ordinary skill in the art, the paper removal device 10 may be also operated manually. In this respect, the carriage 28 may be manually positioned into the desired position and the cutting arm 36 may be manually advanced toward the center of paper roll 12. The controller 54, however, will control the rotation of the turntable 18 and the saw motor 44 in order to provide a smooth cut into the paper roll 12.

Additional modifications and improvements of the present invention may also be apparent to those of ordinary skill in the art such as using different types of sensors, and motors to control the operation of the device 10. Thus, the particular combination of parts described and illustrated herein is intended to represent only a certain embodiment of the present invention, and is not intended to serve as limitations of alternative devices within the spirit and scope of the invention.

What is claimed is:

1. A method of removing paper from a paper roll having a central axis with a device having a frame, a platform rotatably attached to the frame, an elongate track attached to the frame, a movable cutting arm attached to the track and a saw blade rotatably attached to the cutting arm, the method comprising the steps of:

a) positioning the paper roll on the platform such that the central axis extends in generally parallel relation to the track;

b) rotating the paper roll about the central axis defined thereby via the rotation of the platform;

c) advancing the saw blade toward the central axis of the paper roll via the cutting arm;

d) cutting the paper roll with the saw blade; and e) removing the cut paper from the paper roll;

wherein step (b) comprises using a second cutting means for making at least one diametrical cut along a radius in the direction of the central axis in the end of the paper roll to be removed to a depth equal to the total width of the section to be removed from the paper roll prior to rotating the paper roll; whereby, the end of the paper being cut is easily removed and does not hinder the cutting process.

2. The method of claim 1 wherein said diametrical cut is made using a circular handsaw.

3. The method of claim 1 further comprising the steps of:

f) retracting the saw blade from the central axis of the paper roll via the cutting arm;

g) moving the cutting arm along the track into a new position relative to the paper roll; and h) repeating steps (b) through (e).

4. The method of claim 1 wherein the saw blade is a rotary disk saw blade which is caused to rotate about its central axis by a motor as it engages the paper roll.

5. The method of claim 4 wherein said motor is a hydraulic motor.

* * * * *